(12) United States Patent
Briggs et al.

(10) Patent No.: US 6,963,986 B1
(45) Date of Patent: Nov. 8, 2005

(54) DEVICE ENUMERATION CURRENT REDUCTION

(75) Inventors: Randall Don Briggs, Boise, ID (US); Dave Gilbert, Boise, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 539 days.

(21) Appl. No.: 10/177,802

(22) Filed: Jun. 21, 2002

(51) Int. Cl.[7] .............................. G06F 1/26; G06F 1/32
(52) U.S. Cl. ...................................... 713/320; 713/300
(58) Field of Search ................................. 713/300, 320

(56) References Cited

U.S. PATENT DOCUMENTS

| | | | | |
|---|---|---|---|---|
| 5,842,027 A | * | 11/1998 | Oprescu et al. | 713/300 |
| 6,141,762 A | * | 10/2000 | Nicol et al. | 713/300 |
| 6,633,932 B1 | * | 10/2003 | Bork et al. | 710/72 |
| 6,665,802 B1 | * | 12/2003 | Ober | 713/320 |

OTHER PUBLICATIONS

Ron Sartore, Steve Larky and Cathal Phelan, "Speed Power Efficient USB Method," Jun. 9, 2000, Serial No. 09/590,831, pp. 1-18.

* cited by examiner

*Primary Examiner*—Lynne H. Browne
*Assistant Examiner*—Anand B. Patel
(74) *Attorney, Agent, or Firm*—Marger Johnson & McCollom

(57) ABSTRACT

A method of enumerating a peripheral device preferably includes initiating operation of the device in a low-power mode. Power can be conserved, for instance, by slowing processor speed or by shutting off clocks to one or more unneeded blocks of the peripheral device during enumeration. During enumeration, a host computer preferably obtains enumeration information from the peripheral device and then uses that information to select a configuration state for operating the device following enumeration.

20 Claims, 2 Drawing Sheets

During USB enumeration
(Current consumption low)

After USB enumeration
(Full system operation)

DEVICE ENUMERATION CURRENT REDUCTION

BACKGROUND OF THE INVENTION

1. Field of the Invention

The present invention relates to managing power consumption of peripheral devices during and following enumeration. More particularly, this invention relates to controlling device operation parameters to meet power consumption limits.

2. Description of the Related Art

When a Universal Serial Bus (USB) device is connected to the USB of a host computer, the host accesses the device to determine what type of device it is and how much power it needs to operate. This process is referred to as "device enumeration." The USB specification limits the amount of current that a USB bus-powered device may consume during enumeration to 100 mA. The device may request additional current, however, up to a total of 500 mA. After the device enumeration process is complete, if the host system is able to meet the additional power request, it will signal the device to go ahead and consume the amount of current it requested.

Meeting the 100 mA maximum enumeration current limit imposed by the USB specification can be challenging given the fact that a High-Speed capable USB Physical Layer Transceiver Core (PHY) consumes a majority of the 100 mA budget, leaving little current leftover for performing the remaining functions of a USB device necessary for the enumeration process. If the USB device includes a high-performance processor, the current consumption of the processor and the USB PHY together will frequently exceed the 100 mA budget.

One conventional solution is to require an external power source for the peripheral device and therefore not rely entirely on the power received from the USB. Peripheral devices that require an external power source are known as "self-powered" devices. USB bus-power support, however, provides many attractive benefits to customers. Failure to provide this feature typically limits the success of a peripheral device.

Another conventional solution is to use a simple, low-frequency, 8-bit processor that can function with the small amount of current leftover from the PHY. A low performance processor, however, may not be able to keep up with the data throughput requirement for the device, particularly in applications where data needs to be processed (or "touched") by the processor as it flows through the device.

SUMMARY OF THE INVENTION

A method of enumerating a peripheral device preferably includes initiating operation of the device in a low-power mode. Power can be conserved, for instance, by slowing processor speed or by shutting off clocks to one or more unneeded blocks of the peripheral device during enumeration. During enumeration, a host computer preferably obtains enumeration information from the peripheral device and then uses that information to select a configuration state for operating the device following enumeration. The configuration state preferably defines operational parameters (such as clock speed and block state) for the device. If the host has sufficient USB bus power available to meet a power request of the peripheral device, a full-power configuration state can be selected in which the peripheral device can be operated at its full operating speed with all of its blocks operational.

According to another aspect of this invention, a plurality of peripheral devices can be enumerated as described above. The power requirements of the peripheral devices can be periodically determined and power can be reallocated to each of the peripheral devices based on those power requirements. A configuration state that includes, for example, a processor operation speed and/or other power conservation characteristics can be selected for each of the peripheral devices based on its power allocation. Power reallocation can be done, for example, when an additional peripheral device is enumerated or as devices are removed.

A computer system preferably includes a peripheral device connected to a host. The peripheral device is preferably configured to power up in a low-power mode, such as by using a low operating frequency or by disabling unneeded blocks. The host can be configured to retrieve enumeration information from the peripheral device during enumeration and to permit increased current consumption by the peripheral device following enumeration.

BRIEF DESCRIPTION OF THE DRAWINGS

The foregoing and additional aspects and advantages of the present invention will become more readily apparent through the following detailed description of preferred embodiments, made with reference to the attached drawings, in which.

DETAILED DESCRIPTION OF PREFERRED EMBODIMENTS

The principles of the present invention will be described more fully hereinafter with reference to preferred embodiments thereof. It should be noted, however, that these embodiments are provided by way of example, and not by way of limitation, and that the embodiments disclosed herein may be modified in form and detail without departing from the principles and scope of the invention.

The following preferred embodiments provide, among other things, a way to meet the enumeration current limit of the USB specification without sacrificing use of a high-performance processor in the USB device. Preferably, the USB device is powered-up in a low-power mode to begin communicating with a host. This initial low-power mode (including, for example, a low clock frequency and disablement of unneeded blocks) is preferably initiated through device hard-wiring, pin selection, or firmware such as a serial Electrically Erasable Programmable Read Only Memory (EEPROM). Following enumeration, the USB device can operate at full power (or at some intermediate power level), as authorized by the host. The power level can be selected through selection of a configuration state using a USB set configuration (SET_CONFIGURATION) command, for example.

Figure 1:
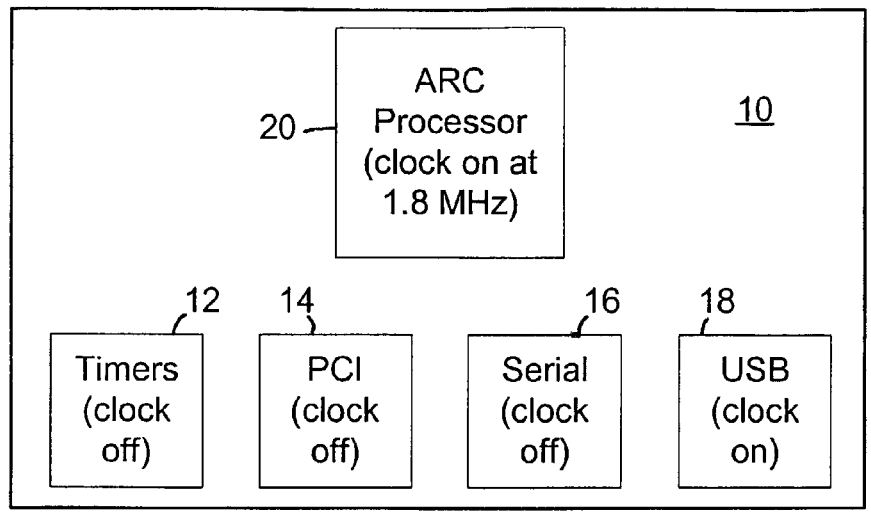
FIG. 1 is a schematic block diagram illustrating operating states of a processor and blocks of a peripheral device in a low-power operation mode, according to one embodiment of the present invention.
Figure 2:
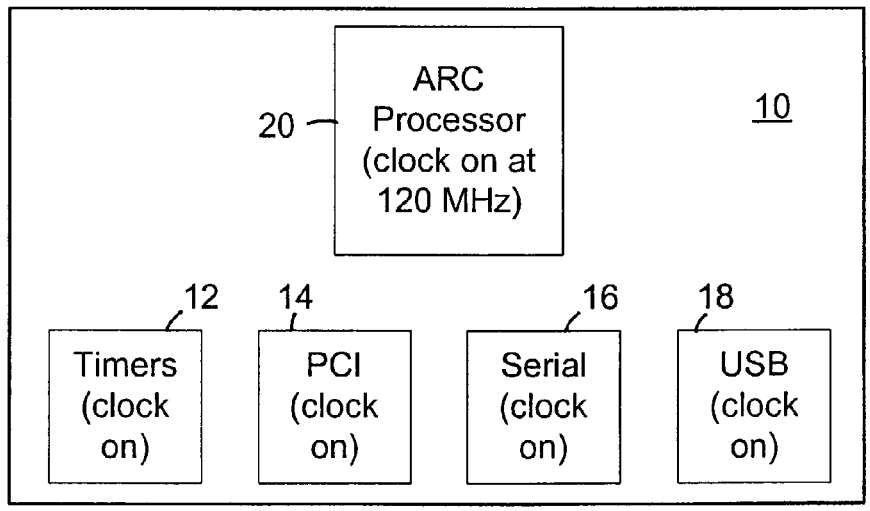
FIG. 2 is a schematic block diagram illustrating operating states of the processor and blocks of FIG. 1 in a full-power operation mode.

FIG. 1 is a block diagram illustrating operating states of a processor and blocks of a USB device 10 during device enumeration, according to one embodiment of this invention. FIG. 2 is a block diagram similar to FIG. 1, but showing processor and block operating states during full operation, following enumeration.

Referring to FIGS. 1 and 2, the peripheral device 10 of this embodiment includes a 120 MHz, 32-bit microprocessor (e.g., an ARC Tangent™-A4 processor from ARC International) 20, a Timers block 12, a PCI block 14, a Serial block 16, and a USB block 18. The processor 20 operates in response to a processor clock. The speed of the processor clock can be adjusted, for example, using a frequency-selection circuit. Each of the blocks 12, 14, 16, 18 is operated in response to a corresponding clock that can be separately turned on or off using clock-gating circuitry. The USB device 10 can be incorporated into a chip package.

As indicated in FIG. 1, during enumeration, the clock of the processor 20 is preferably operated at about 1.875 MHz and the clocks to the Timers block 12, PCI block 14, and Serial block 16 are all turned off. The clock to the USB block 18 is left on to permit communication with a host. Running the processor 20 at 1.875 MHz is sufficient to permit the processor 20 to perform the tasks it must complete during enumeration, such as servicing device enumeration information requests. The selection of clock speed and block operation states for enumeration can be made, for example, during device power up through device pins, through hard-wired device circuitry, or through device firmware such as a serial EEPROM. By slowing the processor clock and shutting off unneeded clocks, power consumption can be reduced during enumeration.

In one embodiment, the device could power up in its lowest possible power mode. The device could then determine if it is operating below a maximum permissible level. If the device determines that its power consumption level can be safely increased without exceeding the prescribed limit, the device could increase its power level before beginning the enumeration process. For example, a USB device could be powered up with a processor speed of 1.875 MHz and with all unnecessary blocks disabled. If the device determines that, in this mode, it is consuming much less than the permissible 100 mA USB enumeration current, it could elect to increase its operating speed or turn on clocks to one or more additional blocks before beginning the enumeration process.

As shown in FIG. 2, after a device 10 is enumerated and receives permission from the USB to consume full power, the clocks to the Timers, PCI, and Serial blocks 12, 14, 16 are each turned on and the speed of the processor 20 clock is increased up to 120 MHz. This embodiment therefore permits a USB device 10 containing a high-performance processor 20 and a High-Speed capable USB PHY (not shown) to be enumerated without exceeding the USB enumeration current limit.

In an alternate embodiment, the host may determine that it cannot authorize the peripheral device to consume full power, but can authorize some intermediate level of power consumption (e.g., between 100 mA and 500 mA). In this case, the host can review USB descriptors from the peripheral device to identify the various possible configuration states of the device. Each configuration state could have a different corresponding power requirement. The configurations could vary in power requirements depending, for example, on processor speed and on which blocks are enabled or disabled. The host could then select a configuration state (e.g., through a Set Configuration command) that falls within the amount of available power and meets the needs of a particular application.

In summary, current consumption of a peripheral device can be reduced during an enumeration process to avoid exceeding a current limit imposed during enumeration. In the embodiments described above, ways of reducing current consumption during enumeration include using a low processor operating frequency and turning off clocks to blocks that are not needed as part of the enumeration process. A configuration state for the device after enumeration can be selected based on an amount of available power. Following enumeration, therefore, the device can be given permission to use more current. In a full power state, for example, the processor clock frequency can be increased to its full rate and the clocks to the other blocks of the device can be enabled.

The foregoing embodiments are preferably configured so that clock gating and frequency selection can be performed "on-the-fly" without glitches in the resulting clocks. Thus, once the USB device is given the go-ahead to consume more current, the device simply writes a new value to a clock control register to enable blocks that were disabled and to switch the processor clock frequency to a higher rate. This aspect of the invention will be described in more detail with reference to FIG. 3.

Figure 3:
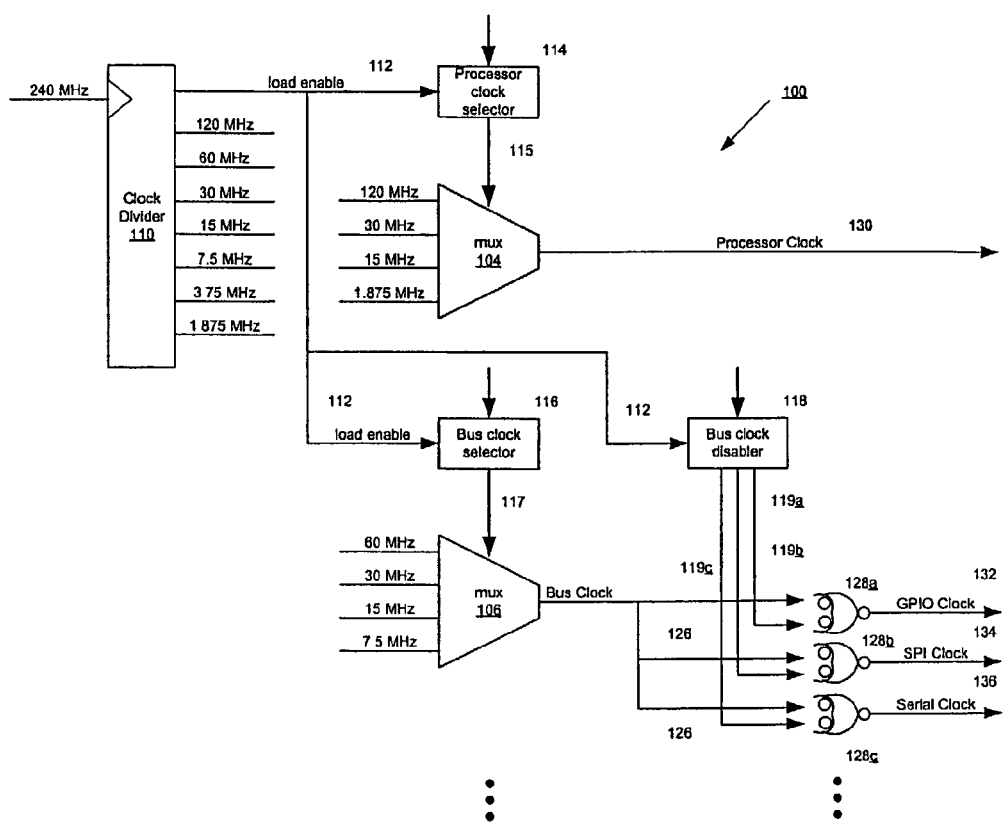
FIG. 3 is a schematic circuit diagram illustrating frequency-selection and clock-gating circuitry for controlling clocks to a processor and to blocks of a peripheral device, according to another aspect of the present invention.

FIG. 3 is a schematic circuit diagram of a frequency-selection and clock-gating circuit 100 according to another aspect of the present invention. Referring to FIG. 3, a clock divider 110 can be a simple counter that provides a plurality of clock frequencies to select from. In this particular embodiment, the clock divider 110 supplies frequencies of 120, 60, 30, 15, 7.5, 9.75, and 1.875 MHz. The clock divider 110 also preferably provides a carefully controlled "load enable" signal 112. The load enable signal is asserted at the precise time in the sequence of clock divisions when it is "safe" for the output forming logic to select a new frequency or to change the gating on a clock. This safe point in time is when all of the clock divider outputs are low. With all clocks low, no glitches will result from changing the output clock selection modes.

The load enable signal 112 is supplied to a processor clock selector 114. The processor clock selector 114 is preferably coupled to a first multiplexer (mux) 104. The first mux 104 can be a 4:1 multiplexer, for example. In this embodiment, the first mux 104 receives four input clock frequencies (120, 30, 15, and 1.875 MHz) from the clock divider 110. The first mux 104 selects one of the four clock inputs to output as a processor clock 130 in response to a signal 115 from the processor clock selector 114.

During enumeration, the first mux 104 preferably selects an operating frequency of 1.875 MHz for the processor clock 130. Although the speed of the processor clock 130 during enumeration is substantially reduced as compared to its full operating frequency of 120 MHz, the processor clock 130 is not stopped completely since the processor should participate in servicing the device requests that are part of the USB device enumeration process. Once enumerated, the first mux 104 can select a higher operating frequency (e.g., 120 MHz) for the processor clock 130.

The load enable signal 112 is also supplied to a Bus clock selector 116. The Bus clock selector 116 is coupled to a second multiplexer (mux) 106. The second mux 106 can be a 4:1 multiplexer that receives four different clock frequencies (60, 30, 15, and 7.5 MHz) from the clock divider 110 as inputs. Based on a signal 117 from the Bus clock selector 116, the second mux 106 selects one of the clocks input from the clock divider 110 to output as a Bus clock 126.

Device block clocks 132, 134, 136 are output from the clock-gating circuitry 100 to operate corresponding blocks in the device. These clocks, for example, can include a General Purpose Input/Output (GPIO) Clock 132, a Serial Peripheral Interface (SPI) Clock 134, and a Serial Clock 136, among others. Each of these clock signals are preferably output from a corresponding logic gate (e.g., a two-input AND gate) 128a, 128b, 128c, respectively. The Bus clock 126 is preferably provided as one of two inputs into each of the logic gates 128a, 128b, 128c. The other input is preferably supplied by the Bus clock disabler 118.

The Bus clock disabler 118 is preferably configured to also receive the load enable signal 112. The Bus clock disabler 118 preferably outputs a separate control signal 119a, 119b, 119c for each of the logic gates 128a, 128b, 128c, respectively. When a control signal 119a, 119b, or 119c from the bus clock disabler 118 is a disable signal, the clock 132, 134, or 136 corresponding to the gate 128a, 128b, or 128c receiving the control signal 119a, 119b, or 119c is turned off. By supplying an appropriate signal to an input of the logic gates 128a, 128b, 128c, therefore, each of the clocks can be selectively disabled to conserve power during enumeration.

In summary, the foregoing embodiments allow a USB device to include high-performance components, such as a high-frequency processor, and still meet the 100 mA device enumeration current limit of the USB specification. By reducing the clock frequency to the processor, but not stopping the processor clock entirely, the processor is able to service USB device request transactions as part of device enumeration while consuming substantially less current than in full operation.

In addition to reducing the current used by a processor in a device, the various aspects of this invention also have application for other high-power blocks in a device. Low-power operation can also be achieved, for example, by stopping or reducing the speed of the clocks to other high-power blocks during enumeration. The clocks to those blocks can then be turned on or restored to an increased (e.g., full) operating speed after the device has been given the go ahead by the host to use more USB current (e.g., through a USB Set Configuration command).

As explained above, a method of enumerating a peripheral device connected to a host computer preferably includes initiating operation of the peripheral device in a low-power mode. Low-power operation can be obtained by configuring device operation parameters in a low-power state, such as by selecting a low processor operating speed or by shutting off clocks to unneeded blocks of the device. These blocks can include, for instance, timers, PCI, and serial blocks. The host computer obtains enumeration information from the device and uses that information to determine whether to authorize the device to consume more power.

If sufficient power is available, a full-power configuration state of the device can be selected by the host through a USB Set Configuration command. If available power is insufficient to enable full power operation, the Set Configuration command may be used to select an intermediate-power configuration state. Each configuration state preferably defines certain operation parameters of the device, such as a device operation speed and clock states, to control the amount of power consumption of the device. The peripheral device is preferably a USB-connected device.

When a plurality of devices are enumerated as described above, the power characteristics of those devices can be periodically revised based on need. More particularly, device power requirements can be periodically evaluated and power can be reallocated among the plurality of peripheral devices based on the immediate power requirements of the devices. Power reallocation can be done, for example, when additional peripheral devices are enumerated through the same device port or when devices are disconnected from the system.

In another method of meeting current limits during device enumeration, a peripheral device begins operation in its lowest power state. The device then determines power requirements of device components needed for enumeration. The device then selects an operating speed of a processor of the device for enumeration based on an amount of available power and the power requirements of other device components needed for enumeration. The processor operating speed during enumeration can be less than full operating speed. Once enumerated, however, the peripheral device can be operated at its full operating frequency.

A computer system according to an embodiment of this invention preferably comprises a host and a peripheral device connected to the host. The peripheral device can be configured to power up in a low-power mode, such as through circuitry configured to initiate operation of the peripheral device in a low operating speed and/or through circuitry configured to disable one or more clocks to unnecessary blocks of the peripheral device. This circuitry can include device hard-wiring, pin selection, or a serial EEPROM, for example. The host can be configured to retrieve enumeration information from the peripheral device during enumeration and to permit increased current consumption by the peripheral device after enumeration. The host can be further configured to select a configuration state of the peripheral device based on an amount of available power. The configuration state can be a full-power configuration state or some intermediate-power configuration state.

The principles of this invention can also be used to manage power allocation between multiple connected devices. Multiple devices can be connected as described above. When multiple devices are connected, power requirements for those devices can be periodically redetermined and as power requirements change, one or more of the peripheral devices be operated in a lower-power mode to permit the devices to satisfy a power budget. For example, post-enumeration operating speeds for processors of the devices can be selected based on present power requirements, one or more clocks of a peripheral device can be turned off to meet the allocated power limit of the device, or both. In this manner, power needs can be continuously evaluated and power reallocated as needs change. Power can be reallocated among devices, for instance, when additional devices are enumerated or as devices are removed.

Where multiple USB-connected devices are connected to a USB port, for instance, a USB interface can determine how much power is required by each of multiple USB-connected devices. Based on that information, the USB interface can elect to run one or more of those devices in a lower-power mode to avoid exceeding the power limits of the USB connection.

If, for example, a mass storage device (MSD) and a second peripheral are both connected through a USB interface, the USB interface can determine the power requirements of the MSD and the second peripheral. If the total power requirements of the two devices exceeds a USB limit, the USB interface can elect to run either the MSD, the second peripheral, or both, in a low-power mode to ensure that the power limits are not exceeded. If a third peripheral is then enumerated, the power needs can be reevaluated and power reallocated between the three devices. One or more of the peripherals could be operated at less than full operating frequency or blocks of one or more of the peripherals could be turned off to conserve power.

According to yet another aspect of this invention, a peripheral device can be initially powered-up in its lowest power-consumption mode, but then operate in an increased power-consumption mode when certain not to exceed enumeration power limits. For example, when a peripheral device initially powers up, the processor of the device can begin operation at its lowest frequency (e.g., 1.875 MHz) and all unneeded blocks can have corresponding clocks deactivated. If the device then determines that it can operate in a higher power-consumption mode without exceeding a prescribed limit, it can proceed to consume more power before beginning enumeration. For example, the processor of the device could then begin operating at a higher frequency (e.g., 15 MHz, 30 MHz, or 120 MHz) and/or additional blocks can be activated.

While the principles of this invention have been shown and described with reference to preferred embodiments thereof, it will be understood by those skilled in the art that various changes in form and details may be made without departing from those principles. The invention should therefore be interpreted to encompass all such variations coming within the spirit and scope of the appended claims.

What is claimed is:

1. A method of enumerating a peripheral device, said method comprising:
   initiating operation of a peripheral device in a low-power mode, wherein the peripheral device comprises a processor configured to be operated at a power-conserving operating frequency during enumeration and at an increased operating frequency after enumeration;
   obtaining enumeration information from the peripheral device; and
   authorizing the peripheral device to increase power consumption following enumeration.

2. A method according to claim 1, wherein the peripheral device is a Universal Serial Bus (USB)-connected device.

3. A method according to claim 1, wherein the low-power mode is obtained by configuring one or more operating parameters of the device to conserve power.

4. A method according to claim 3, wherein one of the parameters includes an operating frequency of a processor of the device and wherein the low-power mode is obtained by operating the processor at less than its full operating frequency.

5. A method according to claim 3, wherein one of the parameters includes a clock state or clock frequency of one or more blocks of the peripheral device.

6. A method according to claim 5, wherein clocks to one or more blocks of the peripheral device are disabled or operated at a lower frequency during enumeration to conserve power.

7. A method of controlling power consumption by a plurality of peripheral devices enumerated according to claim 1, said method comprising:
   determining power requirements of the plurality of peripheral devices; and
   adjusting one or more operating parameters of one or more of the peripheral devices to accommodate the power requirements of other peripheral devices.

8. A method of controlling power consumption by a plurality of peripheral devices, said method comprising:
   initiating operation of the peripheral devices in a low-power mode;
   obtaining enumeration information from the peripheral devices;
   authorizing the peripheral devices to increase power consumption following enumeration;
   determining power requirements of the plurality of peripheral devices; and
   adjusting one or more operating parameters of one or more of the peripheral devices to accommodate the power requirements of other peripheral devices, wherein the operational parameters comprise processor operating frequency and block status.

9. A method according to claim 8, further comprising reducing an operating frequency of a processor of one of the peripheral devices to reduce its power consumption.

10. A method of meeting current limits during device enumeration, said method comprising:
    powering up a peripheral device in a low-power mode, wherein the peripheral device comprises a processor configured to be operated at a power-conserving operating frequency during enumeration and at an increased operating frequency after enumeration; and
    increasing the power consumption of the peripheral device following enumeration.

11. A method according to claim 10, wherein the low-power mode is obtained by selecting a lowest enumeration operating speed available for a device processor.

12. A method according to claim 11, wherein increasing the power consumption includes increasing an operating speed of the processor of the peripheral device to a full operating speed.

13. A method according to claim 10, wherein the peripheral device is a Universal Serial Bus (USB)-connected device.

14. A method according to claim 10, further comprising identifying power requirements for a plurality of peripheral devices and allocating power to each of the devices based on the power requirements.

15. A computer system, comprising:
    a host; and
    a peripheral device connected to the host, said peripheral device configured to power up in a low-power mode, wherein the peripheral device comprises a processor configured to be operated at a power-conserving operating frequency during enumeration and at an increased operating frequency after enumeration;
    wherein the host is configured to retrieve enumeration information from the peripheral device during enumeration and to permit increased current consumption by the peripheral device following enumeration.

16. A system according to claim 15, wherein the host comprises a processor programmed to retrieve enumeration information from the peripheral device.

17. A system according to claim 15, wherein the peripheral device comprises circuitry configured to lower an operating speed of the peripheral device during enumeration.

18. A system according to claim 15, wherein the peripheral device comprises circuitry configured to disable one or more clocks to unnecessary blocks of the peripheral device during enumeration.

19. A system according to claim 15, wherein the peripheral device is a Universal Serial Bus (USB)-connected device.

20. A system according to claim 15, wherein the host is configured to communicate to the peripheral device when the peripheral device is permitted to increase current consumption.

* * * * *